US009114660B1

(12) United States Patent
Miceli et al.

(10) Patent No.: US 9,114,660 B1
(45) Date of Patent: Aug. 25, 2015

(54) OVERFLOW PANEL SYSTEM FOR PHARMACEUTICAL CONTAINER

(75) Inventors: David A. Miceli, Reno, NV (US); Joseph A. Miceli, Spencer, TN (US)

(73) Assignee: Tri State Distribution, Inc., Sparta, TN (US)

( * ) Notice: Subject to any disclaimer, the term of this patent is extended or adjusted under 35 U.S.C. 154(b) by 424 days.

(21) Appl. No.: 13/478,414

(22) Filed: May 23, 2012

Related U.S. Application Data

(63) Continuation-in-part of application No. 13/347,288, filed on Jan. 10, 2012.

(60) Provisional application No. 61/508,347, filed on Jul. 15, 2011.

(51) Int. Cl.
*B32B 38/14* (2006.01)
*B42D 15/00* (2006.01)
*G09F 3/00* (2006.01)
*B65D 51/24* (2006.01)

(52) U.S. Cl.
CPC ................ *B42D 15/00* (2013.01); *B65D 51/24* (2013.01); *G09F 3/0288* (2013.01)

(58) Field of Classification Search
CPC ..... B42D 15/00; G09F 3/0288; G09F 3/0289; G09F 3/10; G09F 3/02; G09F 2003/0272; G09F 11/04; G09F 11/23; G09F 3/00; A61J 7/04; B65D 51/24
USPC ............ 283/117, 81, 105, 101; 358/1.1, 1.12, 358/1.6, 1.9; 206/459.5; 40/310
See application file for complete search history.

(56) References Cited

U.S. PATENT DOCUMENTS

| | | | | |
|---|---|---|---|---|
| 5,329,713 | A | 7/1994 | Lundell | |
| 5,342,093 | A | 8/1994 | Weemink | |
| 5,958,536 | A | 9/1999 | Gelsinger et al. | |
| 6,036,231 | A | 3/2000 | Foote et al. | |
| 6,240,394 | B1 | 5/2001 | Uecker et al. | |
| 6,254,952 | B1 | 7/2001 | Fox et al. | |
| 6,368,688 | B1 | 4/2002 | Crum et al. | |
| 6,715,796 | B2 | 4/2004 | Foote et al. | |
| 7,823,726 | B1 * | 11/2010 | Miceli et al. | 206/459.5 |
| 8,181,370 | B1 | 5/2012 | Miceli et al. | |
| 2003/0112466 | A1 | 6/2003 | Leonardi | |
| 2003/0205897 | A1 * | 11/2003 | Kaufman | 283/117 |

(Continued)

FOREIGN PATENT DOCUMENTS

WO 2006080945 A1 8/2006

*Primary Examiner* — Jacob T Minskey
*Assistant Examiner* — Vishal I Patel
(74) *Attorney, Agent, or Firm* — Luedeka Neely Group, P.C.

(57) ABSTRACT

A method of producing a label for a prescription pharmaceutical storage container includes providing a label system having at least a first label panel, a second label panel, and a third label panel positioned on a single rectangular label. Indicia providing critical prescription information is printed on the first label panel. On the second panel, indicia providing one of a continuation of the prescription information and warning information is printed. The continuation of the prescription information is printed on the second label panel when a length of the prescription information is too long to fit on the first label panel and the warning information is printed on the second label panel when the length of the prescription information fits on the first label panel. The warning information is printed on the third label panel when prescription information is printed on the second label panel.

22 Claims, 8 Drawing Sheets

(56) References Cited

U.S. PATENT DOCUMENTS

| | | | |
|---|---|---|---|
| 2006/0163869 A1 | 7/2006 | Adler et al. | |
| 2008/0262930 A1 | 10/2008 | Miceli et al. | |
| 2010/0252474 A1 | 10/2010 | Miceli et al. | |
| 2012/0285366 A1* | 11/2012 | Perez | 116/278 |
| 2013/0278948 A1* | 10/2013 | Miller | 358/1.6 |

* cited by examiner

OVERFLOW PANEL SYSTEM FOR PHARMACEUTICAL CONTAINER

CROSS-REFERENCE TO RELATED APPLICATIONS

This application is a continuation-in-part to co-pending U.S. application Ser. No. 13/347,288 filed Jan. 10, 2012, and entitled "Overflow Panel System for Pharmaceutical Container," which claimed priority to U.S. Provisional Application Ser. No. 61/508,347 filed Jul. 15, 2011, and entitled "Overflow Panel System for Pharmaceutical Container," both of which are incorporated by reference herein in their entireties.

FIELD

This disclosure relates generally to a label system that may be applied to a vial, bottle, or other container. More particularly, this disclosure relates to a labeling system for prescription containers, the labeling system having a first label for printing prescription information and an overflow label for printing a continuation of the prescription information if the prescription information is too large to fit on the first label.

BACKGROUND

The present disclosure relates generally to a prescription pharmaceutical container labeling system.

Currently, labels applied to prescription containers include what is commonly referred to as SIG information. SIG is short for Signa (Latin) which means "written," and this terminology is a remnant from the past when all prescriptions were handwritten and signed by the physician. Accordingly, SIG information refers to the information on the written prescription signed by the physician, which is (1) the name of the patient, (2) identification of the medicine, e.g., the name and strength of the medicine, and (3) instructions to the patient for taking the medicine.

It has become common for Purpose information to be added to the prescription label. Purpose information is information that relates to why the medicine is taken—e.g., to reduce inflammation, for nausea, for pain, and the like.

It is desired in some circumstances to use 12-point or larger font for all SIG and Purpose information on prescription labels. In many cases, the SIG and Purpose information in 12-point font does not present a space issue. However, for some prescriptions, which have lengthy instruction information, such as in the case of prednisone, the SIG and Purpose information is difficult to fit on certain containers especially in larger font sizes and/or when auxiliary information is needed. Auxiliary information is not currently required, but is often desired. For the purpose of example, auxiliary information often provided involves information such as food interaction cautions, such as "Do Not Take With Dairy" in the case of tetracycline prescriptions, since tetracycline is made less effective when consumed with dairy. Auxiliary information labels are conventionally narrow, pre-printed stickers provided in dispensers in the manner of tape and applied to a free space on the label by the pharmacist dispensing the prescription.

Pharmaceutical containers are generally provided with a standard label space depending on the size of the container. Conventional smaller containers, such as 13 dram and 16 dram containers, have a label space of usually about 4 inches in circumference and a height that increases from about 2 inches to about 3 inches based on the size of the container.

Typical larger containers, 30 drams and up, usually have a label space having a height range similar to the smaller containers but the circumference is increased to about 6 inches.

As it stands, the only way pharmacies can currently provide SIG and Purpose information in 12-point font together with desired auxiliary warning information for all possible prescriptions using conventional labels and containers is to use excessively large containers typically having large wrap around labels. That is, the prescription may fit into a small container, such as a 13 dram vial, but the label information as currently provided requires label space that requires a much larger container, such as a 30 dram vial. Thus, the prescription is provided in the larger 30 dram vial.

Accordingly, one major problem with conventional prescription labels is that they will require pharmacies to use larger and more expensive vials and containers for every prescription they dispense if they desire to have a standard label configuration, even though the larger containers would not be necessary for most prescriptions. Alternatively, if pharmacists decide to use different sized containers based on label space needed for a particular prescription, they must currently use two different label configurations in order to provide labels having SIG and Purpose information in 12-point font for different sized containers. This requires pharmacists to stock at least two different type of labels and two separate printers to prevent having to change settings on the pharmacist printer every time a different sized label is needed.

Accordingly, disadvantages exist with regard to conventional prescription labels. As seen in FIGS. 1A-1B, prior art prescription containers, such as containers 4 and 6, are typically cylindrical and the labeling for the cylindrical containers 4, 6 is oriented such that the lines of alphanumeric characters are disposed on labels 2A substantially perpendicular to the axis of the container. Prior art labels 2A have traditionally been printed in a single size and single geometric design in order to simplify inventory and procedures at the pharmacies. In an attempt to reduce costs, the label sizes are typically designed for the smallest sized cylindrical containers.

There are many disadvantages to using a single label sized to fit all sizes of containers. For example, a label sized to fit a small container requires the information displayed on the label to be printed in a small font (less than 12 point) in an attempt to fit all the information on to the label. Even if all the information is able to be printed on a single label, a patient must still rotate the container in order to read the information. As shown in FIG. 1A, the small diameter of container 4 and the words and phrases of label 2A having more than a few letters results in the holder of the container to rotate the container about its axis in order to be able to read the information contained thereon. This is especially cumbersome given the multiple characters and letters required for most pharmaceutical names and prescription instructions. Additionally, because these smaller sized labels and fonts are generally used on the larger containers, the information contained on the larger container 6 is still difficult to read.

Additionally, as more and more information is desired to be provided on a prescription label, pharmacies have used excessively large containers having larger wrap around labels to display the information in a readable size. Even if large wrap around labels are used, any information and warnings on the labels in the form of sentences or small paragraphs require multiple turns and rotations of the container in order for a user to be able to read that information. Further, there still may not be enough space left on the container for a pharmacist to include pre-printed labels having Auxiliary information.

Instead, the critical auxiliary information is usually provided on an additional handout sheet that is often thrown away or lost by the patient.

Another disadvantage in using a single label is that the length of the information provided to the patient varies by prescription. For example, the instructions for taking certain pharmaceuticals may be very brief (e.g., "take 2 times a day for 7 days") while others may be much longer (e.g., "take 5 times on day 1, 4 times on day 2, 3 times on day 3, 2 times on day 4, and 1 time on day 5"). As a result, unused space may be left on a larger container or a larger label for a prescription having brief instructions.

Accordingly, improvement is desired in the labeling of pharmaceutical containers and what is desired is a way to label such pharmaceutical containers that maximizes the space on the container. Such will improve the readability of the information, medical or otherwise, positioned on the pharmaceutical container such that a reader of that information can readily read, ascertain, and comprehend the information. Additionally, it is desired to provide the labeling system so that a single label configuration may be used for a variety of sized containers

SUMMARY

A method of producing a label for a prescription pharmaceutical storage container for holding and dispensing a pharmaceutical for a patient is disclosed. The method includes the steps of: providing a supply of prescription pharmaceutical storage containers, the supply including a first container having a first label surface having a circumference of about 4 inches to about 5 inches and a second container having a second label surface having a circumference of about 6 inches or more; providing a label system having at least a first label panel, a second label panel, and a third label panel positioned on a single rectangular label, the first label panel and the second label panel providing a first label section having a length of about 4.25 inches or less and the third label panel providing a second label section having a length of about 2.125 inches or less, the first label section being operable to be removed from the second label section; printing indicia providing critical prescription information on the first label panel, the critical prescription information including the patient name, instructions for taking the pharmaceutical, and an identification of the pharmaceutical; determining whether a length of the critical prescription information fits on the first label panel; printing indicia providing one of a continuation of the critical prescription information and warning information on the second label panel based on the determination of whether the length of the critical prescription information fits on the first label panel, the continuation of the critical prescription information being printed on the second label panel when the length of the critical prescription information is determined to be too long to fit on the first label panel and the warning information being printed on the second label panel when the length of the critical prescription information is determined to fit on the first label panel; printing indicia providing the warning information on the third label panel when the second label panel includes the continuation of the critical prescription information; removing the first label section from the second label section when the length of the critical prescription information fits on the first label panel; and applying the single rectangular label to one of the first container and the second container, the single rectangular label being applied to the first container when the length of the critical prescription information fits on the first label panel and the single rectangular label being applied to the second container when the length of the critical prescription information is too long to fit on the first label panel.

According to some embodiments, the critical prescription information includes the purpose of the pharmaceutical and is printed in at least 12 point font.

In certain embodiments, the steps of determining whether the length of the prescription information fits on the first label and printing indicia on the first, second, and third label panels is automated. The label system may also include a perforated line disposed between the second label panel and the third label panel for assisting removal of the first label section from the second label section.

According to some embodiments, the first container is cylindrically shaped and has a volume of approximately 13 drams to 20 drams. In some embodiments, the circumference of the first label surface of the first container is about 4 inches and the first label section has a length of about 4 inches.

According to another embodiment of the disclosure, a labeling system for a prescription pharmaceutical storage container is provided. The labeling system includes a first label panel configured to receive prescription information having instructions for taking the pharmaceutical. A second label panel is configured to receive one of a continuation of the prescription information and warning information, the continuation of the prescription information being printed on the second label panel when a length of the prescription information is too long to fit on the first label panel and the warning information being printed on the second label panel when the length of the prescription information fits on the first label panel. A third label panel is configured to receive the warning information when the continuation of the prescription information is printed on the second label panel. The first label panel, second label panel, and third label panel are positioned on a single rectangular label with the third panel being operable to be removed from the single rectangular label when the prescription information and the warning information fits entirely on the first and second label panels so that the single rectangular label including the first label panel and the second label panel is dimensioned and configured to be applied to the prescription pharmaceutical storage container having a first label surface having a circumference of about 4 inches to about 5 inches.

According to some embodiments, the pharmaceutical storage container the single rectangular label is dimensioned and configured to be applied to is cylindrically shaped. In certain embodiments, the single rectangular label including the first label panel and the second label panel is dimensioned and configured to be applied to the prescription pharmaceutical storage container having a volume of approximately 13 drams to 20 drams. The first and second label panel may include a combined length of about 4.25 inches or less.

According to some embodiments, a perforated line may be disposed between the second label panel and the third label panel for assisting in the removal of the third label panel from the single rectangular label. A perforated line may also be disposed between the first label panel and the second label panel for assisting in the removal of the second label panel from the first label panel.

In certain embodiments, the prescription information further includes a purpose of the pharmaceutical and the prescription information is printed in at least 12-point font.

According to yet another embodiment, a computerized method is provided for producing a label for a prescription pharmaceutical storage container for holding and dispensing a pharmaceutical for a patient whereby a pharmacy may reduce a number of distinct labels required for labeling containers having different sizes for saving the pharmacy money, reducing the pharmacy workflow requirements, reducing inventory, and enhancing productivity. The computerized method includes the steps of providing a label system having a first label section and a second label section, the first label section including a first label panel and a second label panel and the second label section including a third label panel; providing prescription information to the computer, the prescription information including an identification of the pharmaceutical and instructions for taking the pharmaceutical; determining at the computer based on the prescription information whether the pharmaceutical will fit into a smaller container having a first label surface having a circumference of about 4 inches to about 5 inches; determining at the computer whether a length of the prescription information fits on the first label panel; printing under the control of the computer indicia providing the prescription information on the first label panel; printing under the control of the computer indicia providing one of a continuation of the prescription information and warning information corresponding to the identification of the pharmaceutical on the second label panel based on the determination of whether the length of the prescription information fits on the first label panel, the continuation of the prescription information being printed on the second label panel when the length of the prescription information is determined to be too long to fit on the first label panel and the warning information being printed on the second label panel when the length of the prescription information is determined to fit on the first label panel; printing under the control of the computer indicia providing the warning information on the third label panel when the second label panel includes the continuation of the prescription information; removing the first label section from the second label section when the length of the prescription information and warning information fits on the first label section and the pharmaceutical fits in the smaller container; and applying the label system to one of the smaller container and a larger container having a second label surface having a circumference of about 6 inches or more, the label system being applied to the smaller container when the length of the prescription information and warning information fits on the first label section and the pharmaceutical fits in the smaller container, and the label system being applied to the larger container when at least one of the length of the prescription information and warning information is too long to fit on the first label section and the pharmaceutical does not fit in the smaller container.

According to some embodiments, the computerized method further includes printing under the control of the computer one of an advertisement and a bilingual label on the third label panel when the length of the prescription information and the warning information fits on the first label section; and applying the label system to the larger container when one of the advertisement and the bilingual label is printed on the third label panel.

In some embodiments, the label system further includes a continuous roll of label panels including at least the first label panel, the second label panel, the third label panel, and a fourth label panel, each of the first label panel, second label panel, third label panel, and fourth label panel being operable to be removed from adjacent label panels. The computerized method further includes printing under the control of the computer indicia providing at least a portion of second prescription information of a second pharmaceutical prescription on the third label panel when the length of the prescription information is determined to fit on the first label panel; and printing under the control of the computer indicia providing at least a portion of the second prescription information of the second pharmaceutical prescription on the fourth label panel when the length of the prescription information is determined to be too long to fit on the first label panel.

BRIEF DESCRIPTION OF THE DRAWINGS

Further advantages of the disclosure are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1A:
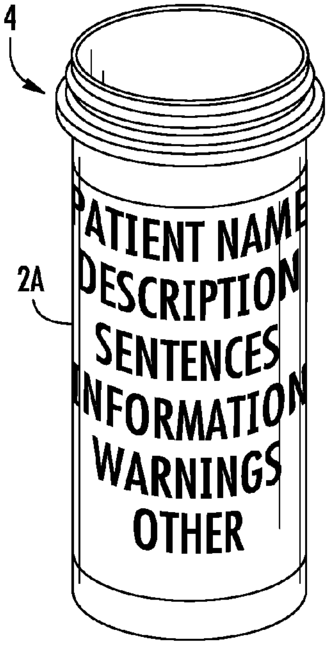
FIG. 1A PRIOR ART
FIG. 1A depicts a perspective view of an example of a conventional label placed on a smaller sized cylindrical pharmaceutical container in a pharmaceutical storage system.
Figure 1B:
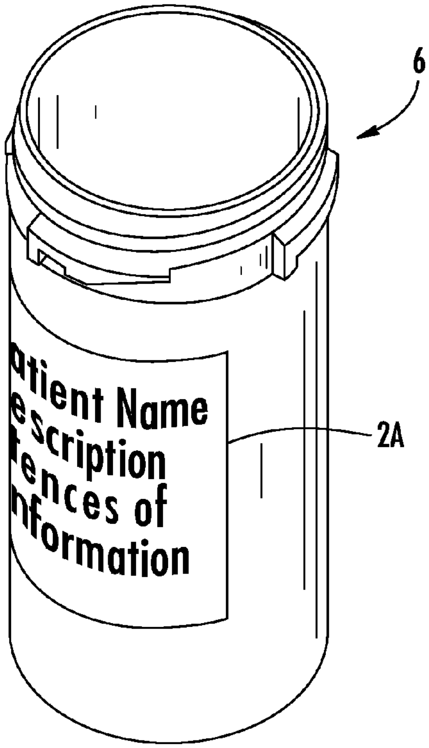
FIG. 1B PRIOR ART
FIG. 1B depicts a perspective view of the conventional label shown in FIG. 1A placed on a larger sized cylindrical pharmaceutical container in a pharmaceutical storage system.

The disclosure relates to methods of producing a label for a prescription pharmaceutical storage container for holding and dispensing a pharmaceutical for a patient that enables a pharmacy to reduce the number of labels required for labeling containers having different sizes. This can result in a cost savings in labels, cost savings in vials, reduces the pharmacy workflow requirements, reduces inventory costs, and may enable enhanced productivity in the pharmacy.

Referring to FIGS. 2-3, two different prescription pharmaceutical storage systems according to the disclosure are shown, each including a pharmaceutical container 12 for holding and dispensing a pharmaceutical prescription for a patient and a rectangular label 14 sized and configured to wrap around the outer circumference of the pharmaceutical container 12. The container 12 is preferably cylindrical but can take various shapes such as triangular, quadrilateral, and the like. The container 12 includes a neck 16 and one or more engaging devices 18. The engaging devices 18 are operable to interact with an engaging mechanism on a closure/cap to secure the closure to the container 12. Suitable engaging devices 18 and engaging mechanisms include one or more beads, threads, lugs or the like as known in the art. The space between the neck 16 and a bottom 19 of the container 12 provides space to position the label 14.

Figure 2A:
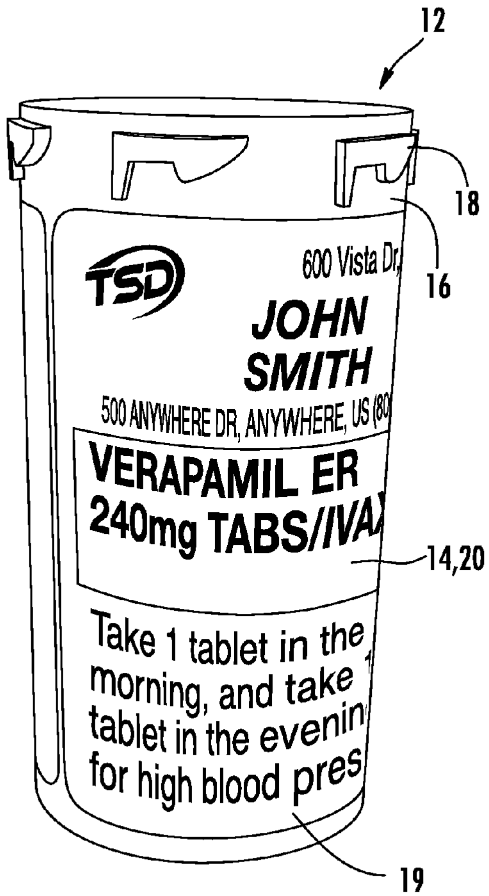
FIG. 2A depicts a front view of a smaller sized container having a label including a first label panel and a second label panel applied thereto according to one embodiment of the disclosure.
Figure 2B:
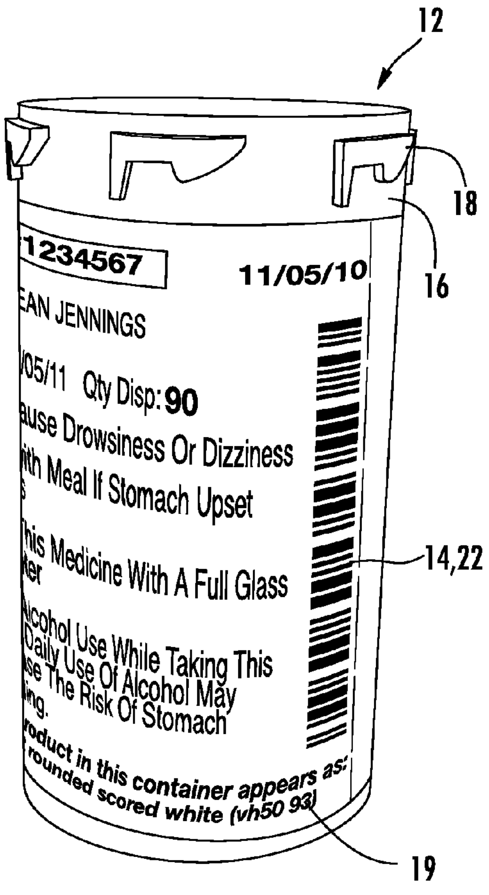
FIG. 2B depicts a rear view of the second label panel applied to the container of FIG. 2A according to one embodiment of the disclosure.

The container 12 shown in FIGS. 2A-2B is a small sized container, preferably a 13 or 16 dram container. While particular dimensions of various containers 12 can vary, the space to position the labels on a 13 dram container typically includes a height of between about 2 inches to about 2.5 inches and a circumference of about 4 inches to about 4.5 inches. A 16 dram container typically includes the same circumference but includes a larger height of about 2.5 inches to about 3 inches.

Figure 3A:
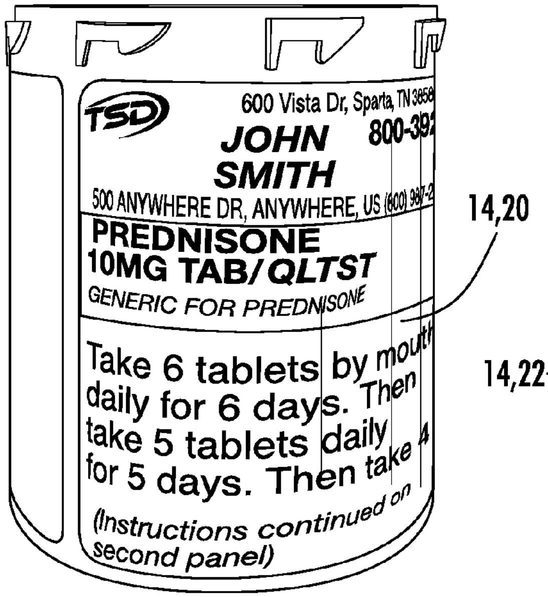
FIG. 3A depicts a front view of a larger sized container having a label including a first label panel, second label panel, and third label panel applied thereto according to one embodiment of the disclosure.
Figure 3B:
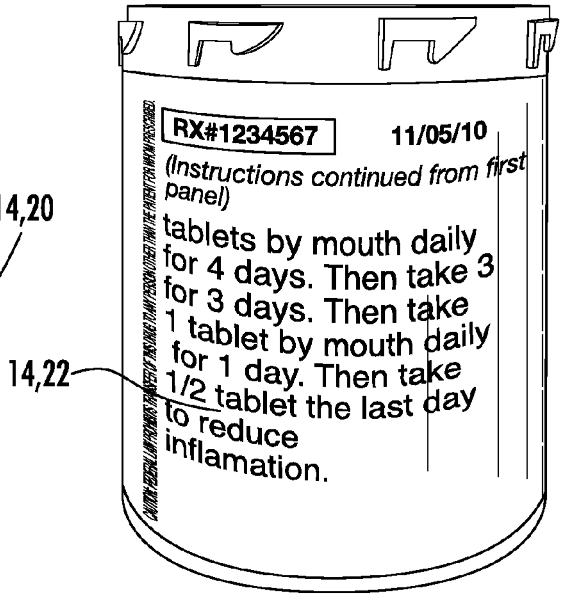
FIG. 3B depicts a side view of the second label panel applied to the container of FIG. 3A according to one embodiment of the disclosure.
Figure 3C:
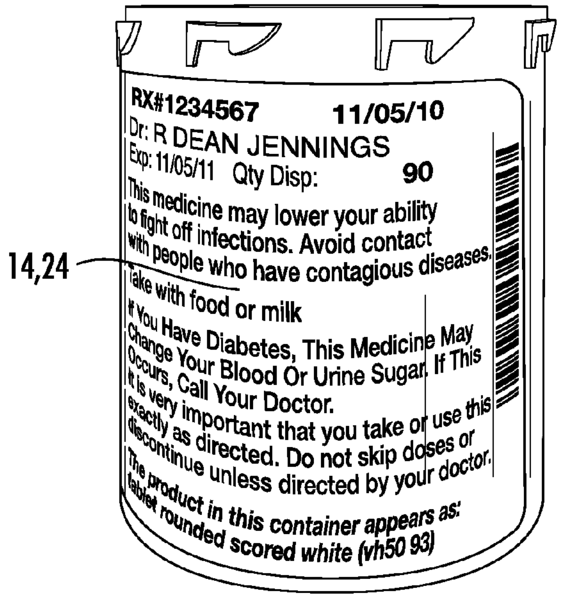
FIG. 3C depicts another side view of the third label panel applied to the container of FIGS. 3A and 3B according to one embodiment of the disclosure.

Referring to FIGS. 3A-3C, a larger sized container 12 is shown such as a 30 dram container. While the particular dimensions of larger containers typically vary more widely than the dimensions of smaller containers, larger containers usually include a circumference of about 6 inches or greater giving the ability to apply longer labels to the larger containers. Pharmacies typically stock a supply of both smaller and larger containers to be used based on the prescription needed to be filled. In other words, a pharmacist generally chooses an appropriate container based on the volume of the prescribed pharmaceutical needed to fit in the pharmaceutical container 12.

Figure 4:
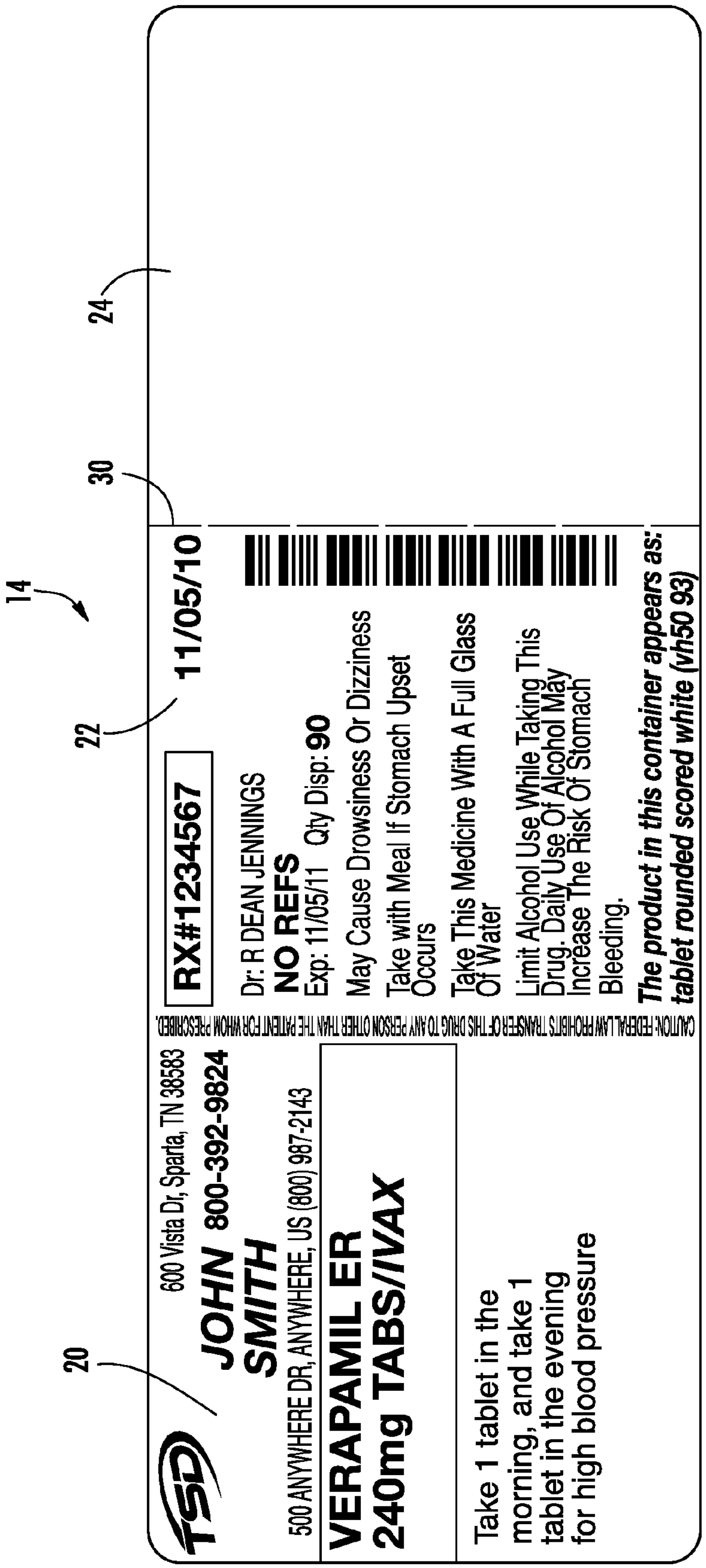
FIG. 4 depicts a printed label for an exemplary verapamil prescription according to one embodiment of the disclosure.
Figure 5:
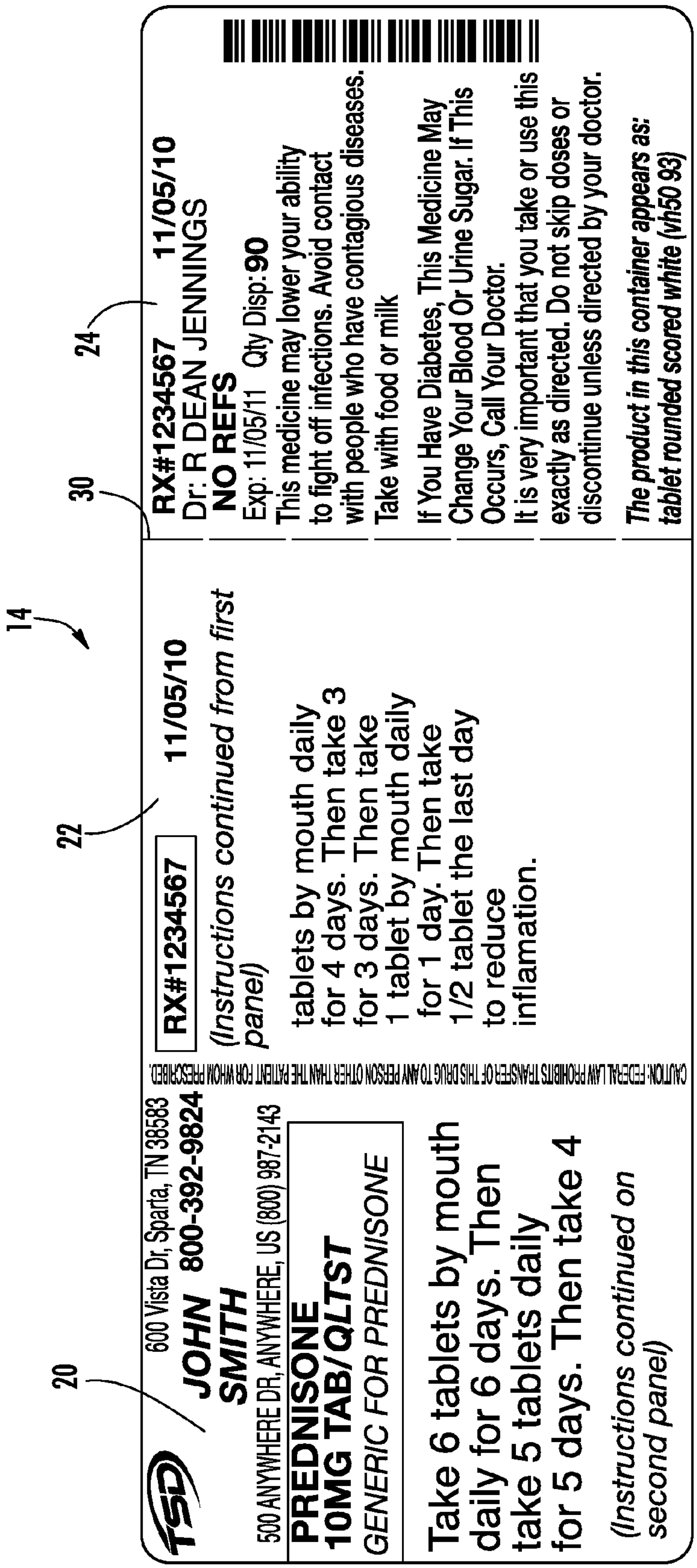
FIG. 5 depicts a printed label for an exemplary prednisone prescription according to one embodiment of the disclosure.

Referring to FIGS. 4 and 5, two rectangular labels 14 are shown as printed according to the disclosure for two exemplary prescriptions, one prescription for the pharmaceutical commonly known as verapamil and another prescription for the pharmaceutical commonly known as prednisone. The labels 14 may be provided on a label sheet to be printed by a laser printer or inkjet printer or on a label roll to be printed by a direct thermal printer, and the printers may be color or black and white printers.

Each rectangular label 14 shown in FIGS. 4 and 5 preferably includes a height ranging from about 2 inches to about 2.5 inches, and most preferably about 2.125 inches for labels designed to be applied to a 13 dram container and about 2.5 inches for labels designed to be applied to a 16 dram container. The length of each of the labels 14 preferably ranges from about 6 inches to about 6.875 inches. The rectangular label 14 preferably includes a first label panel 20, a second label panel 22, and a third label panel 24. Each of the three label panels 20, 22, and 24 is preferably of substantially the same dimensions and dimensioned and configured such that the information printed on each particular label panel is able to be read when applied to a container 12 without requiring significantly turning or rotating of the container 12. In preferred embodiments, each label panel is about 2 inches to 2.5 inches in height, and most preferably about 2.125 inches, and about 2 inches to 2.125 inches in length, and most preferably about 2 inches.

The first label panel 20 generally includes more critical patient directed prescription information printed on the label panel such as the SIG information, i.e., (1) the name of the patient, (2) identification of the medicine, e.g., the name and strength of the medicine, and (3) instructions to the patient for taking the medicine. The prescription information of the first label panel 20 also preferably includes the "Purpose" or intended use of the pharmaceutical which should be stated in clear and simple terms.

The prescription information printed on the first label panel 20 is usually required, at least in part, to be provided on the pharmaceutical container by various national and regional laws. While the prescription information may be printed on the first label in any particular size, the prescription information is preferably printed in 12-point font in order to improve the readability of the prescription information. While smaller font sizes may be readable by certain patients, other patients with vision impairments such as the elderly greatly benefit from larger font sizes. However, it is inconvenient and often times impracticable for a pharmacist to alter font sizes on prescription labels based on the needs of each particular patient. Accordingly, it is preferable that a uniform font style and size be chosen and used for each patient.

The information of the second label panel 22 and third label panel 24 will vary depending on the particular prescription being filled by the pharmacist. When the prescription information is able to be printed entirely on the first label panel 20, the second label panel 22 is used as an auxiliary label. The auxiliary label generally includes warning or auxiliary information such as "may cause drowsiness," "take with food," "do not take with alcohol," etc. The warning information of the auxiliary label should clarify the instructions of the prescription information and is important to the patient's appropriate use of the pharmaceutical. When the prescription information fits completely within the first label panel 20, the third label panel 24 is not needed. In these situations, all the necessary and preferred information is able to be depicted on the first and second label panels 20 and 22. Further, a label 14 containing only the first and second label panels 20, 22 is dimensioned to fit on the smallest commonly used prescription containers, 13 dram and 16 dram containers. As further described below, the third label panel 24 may be removed from labels 24 when prescriptions have shorter prescription information so that the label 14 containing just the first and second label panels 20 and 22 may be applied to smaller containers having circumferences as small as about 4 inches.

In situations where the prescription information does not fit entirely on the first label panel 20, the prescription information can be continued on the second label panel 22. The third label panel 24 is then used to print the auxiliary label for the prescription. In situations in which the prescription information overflows from the first label panel 20 to the second label panel 22, the label 14, including the third label panel 24 having the warning information, is applied to a larger bottle having a greater circumference such as the 30 dram container. Alternatively, even when the prescription information does fit entirely on the first label panel 20 but the volume of the pharmaceutical needed to fill the prescription is too great to fit in a smaller container or the pharmacist would like to use the third label panel 24 for another purpose such as an advertisement, the advertisement may be printed on the third label panel 24 and the label 14 containing the first, second, and third label panels 20, 22, and 24 is applied to a larger container.

In an alternate embodiment, the prescription information and auxiliary warning information may sometimes be combined when printed on label 14. For example, in situations in which a pharmaceutical prescription includes prescription information having few characters but a large amount of warning information needed to be printed on an auxiliary label, some of the warning information may be included in the first label panel 20 and the remaining warning information is then printed on the second label panel 22. Alternatively, where the prescription information is long and the warning information is short, the prescription information may overflow to the second label panel 22 and printed along with the warning information printed on the same panel. In certain situations, the warning information may also overflow to the third label panel 24 in situations when it is too long to fit entirely on the second label panel 22.

In preferred embodiments, one or more of the label panels are operable to be selectively removed from the single continuous label 14 by tearing or pealing the particular label panel from the label 14. To facilitate removal, the label 14 may include one or more perforated lines 30 disposed between the appropriate label panels. The perforated lines preferably include a plurality of tab portions which can be used to both hold the panels of the label 14 together and facilitate removal of a particular panel or panels from the label 14. In other words, the tabs are used to connect adjacent panels to facilitate removal of the label 14 from a substrate as a single continuous piece while also facilitating a user, such as a pharmacist, in separating a particular panel from the label 14 by breaking the tabs when a certain panel is desired to not be included with label 14 applied to a container 12. For reasons discussed below, each label 14 preferably includes, as shown in FIGS. 4-5, a perforated line 30 disposed between the second label panel 22 and third label panel 24 but no perforated line between the first label panel 20 and second label panel 22. Thus, the label 14 preferably includes a first section containing the first label panel 20 and the second label panel 22. The second section includes the third label panel 24. When applying the label 14 to a smaller container, the tabs of the perforated line 30 between the second label panel 22 and third label panel 24 are broken so that label 14 having only the first section is removed from the substrate. When applying the label 14 to a larger container and/or when it is desired to include the third label panel 24 as part of label 14, the tabs facilitate removal of the label 14 including both the first label section and the second label section.

It is estimated that the entirety of the prescription information for most pharmaceuticals and prescriptions will fit onto the first label panel 20, and, thus, the second label panel 24 will usually be used as an auxiliary label. It will also be understood that a 13 dram cylindrical container 12 such as that shown in FIGS. 2A-2B is able to accommodate, without any overwrapping of the label 14, a rectangular label having a total length of about 4 inches and a height of about 2.125 inches. Thus, assuming the pharmaceutical will fit within a 13 dram container, the present disclosure provides a label system that has at least two distinct label panels to enable all critical prescription information as well as any necessary and desired warning information to be supplied on a label sized to fit a container as small as a 13 dram container for most prescriptions. Such critical information includes, as described above, the SIG and Purpose information of the prescription. This is highly significant because a pharmacy using the described label system can fill the majority of prescriptions using the smaller 13 and 16 dram sized containers. As will be appreciated, the cost savings represented by enabling the majority of prescriptions to be provided in the smaller 13 and 16 dram containers as opposed to larger containers, is significant and enables considerable cost savings to pharmacies.

It is noted that the third label panel 24 and overflow concept described above is particularly useful in situations where the label 14 of a particular pharmaceutical prescription is printed in a language other than English as the same information printed in other languages frequently requires more characters than its English counterpart. Thus, in locations where customers request the pharmacist to print the pharmaceutical prescription label in another language such as Spanish, the third label panel will likely be more frequently used.

Referring to the exemplary verapamil prescription printed on the label 14 shown in FIG. 4, the first label panel 20 includes the prescription information which identifies the patient's name, the name and dosage of the pharmaceutical, the instructions to the patient for taking the pharmaceutical, and the purpose of the pharmaceutical. As the entirety of the prescription information for this particular verapamil prescription is able to fit on the first label panel 20 in a readable font, preferably 12 point font, the second label panel 22 is used as an auxiliary label and includes various warnings associated with the pharmaceutical, the prescribing doctor, date of filling the prescription, expiration date, and quantity. Accordingly, the third label panel 24 is not needed and may be removed so that the continuous label 14 containing the first label panel 20 and second label panel 22 may be applied to a 13 dram container as shown in FIGS. 2A-2B.

Referring to the exemplary prednisone prescription printed on the label 14 of FIG. 5, the first label panel 20 similarly identifies the patient's name, the name and dosage of the pharmaceutical, and a portion of the instructions to the patient for taking the pharmaceutical. However, as this particular prescription requires the amount of the pharmaceutical taken to be tapered off over the course of the prescribed period, the length of the prescription information, and, in particular the instructions to the patient for taking the pharmaceutical, is too long to fit entirely on the first label panel 20. Accordingly, the remaining prescription information is printed on the second label panel 22 and the auxiliary warning information is printed on the third label panel 24. As the warning information is preferably provided on each of the containers 12 as opposed to printing the warning information on handouts or other loose sheets that typically do not stay with the container during the consumption of the full dosage of the prescription, the continuous labels 14 containing all three panels is applied to a larger container such as the 30 dram container depicted in FIGS. 3A-3B.

Figure 6:
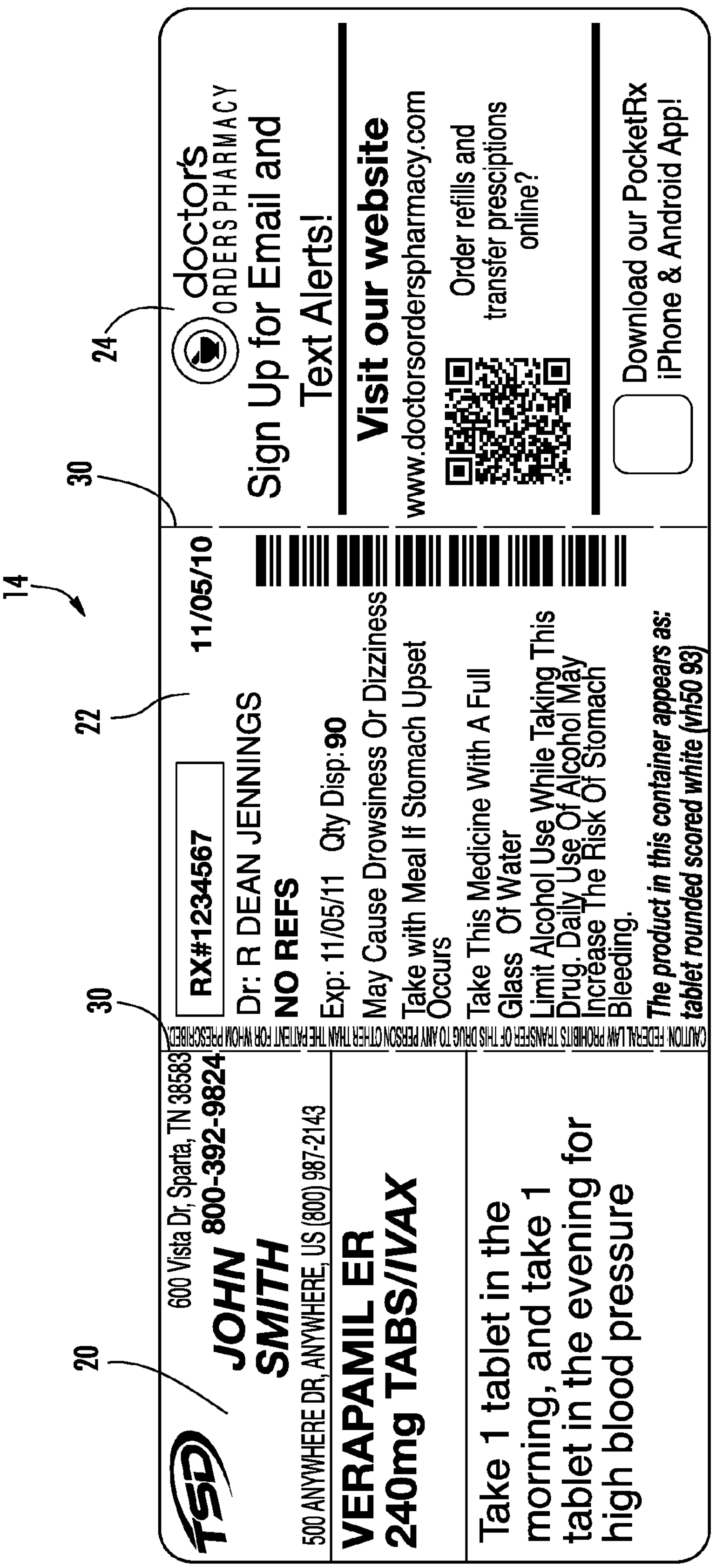
FIG. 6 depicts a printed label for an exemplary verapamil prescription where the third label panel is used to print an advertisement according to one embodiment of the disclosure.
Figure 7:
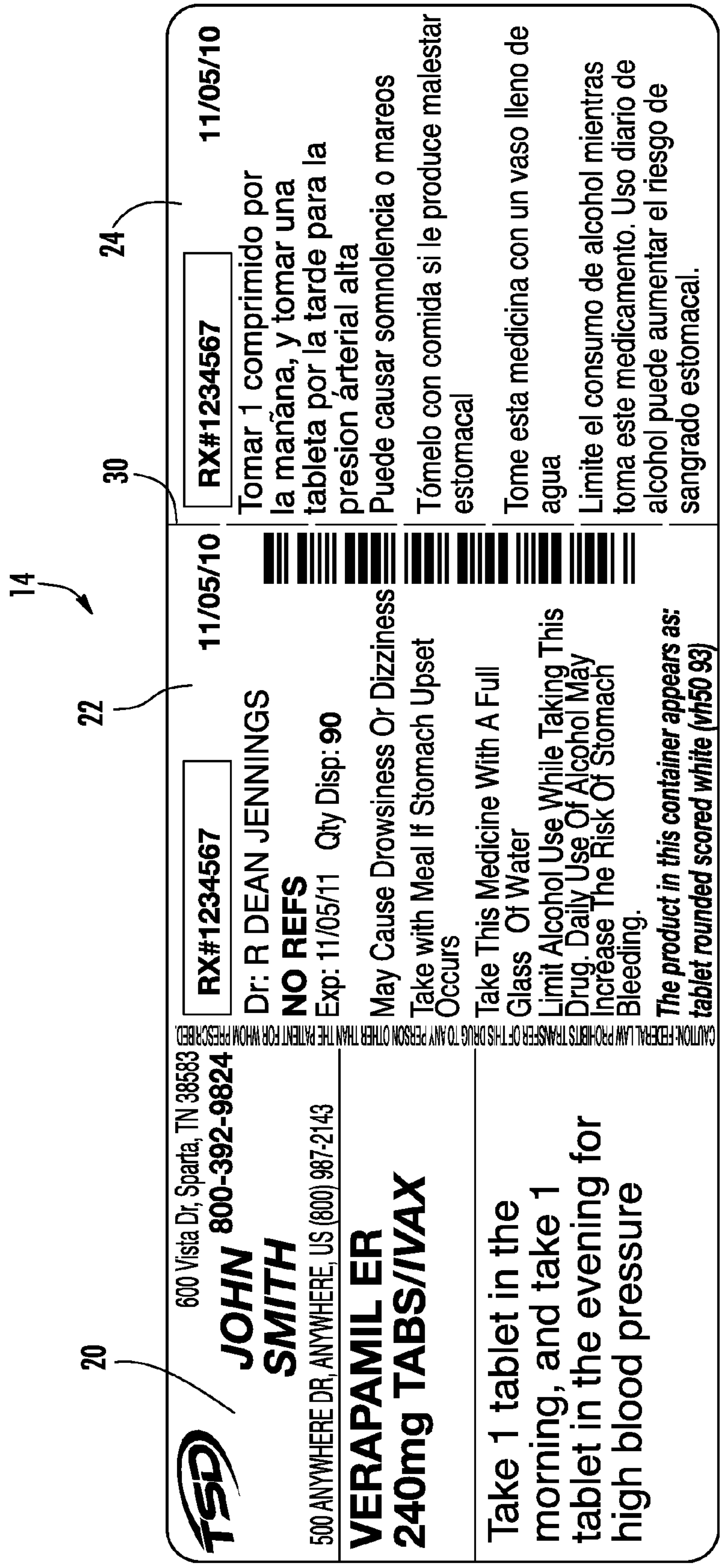
FIG. 7 depicts a printed label for an exemplary verapamil prescription where the third label panel is used to print prescription and warning information in a language different than the language of the information printed on the first and second label panels according to one embodiment of the disclosure.

Referring to FIGS. 6-7, the third label panel may be used for other purposes for prescriptions in which the prescription information fits entirely within the first label panel 20. As explained above, where use of the third label panel 24 is desired, the third label panel 24 is not removed and the continuous label 14 including the third label panel is applied to a larger container such as the 30 dram container. As shown in FIG. 6, the third label panel 24 may be used to print an advertisement. The advertisement can be specifically directed to goods or services that are medically related to the pharmaceutical in the container 12. For example, advertisements directed at diabetic testing equipment can be affixed to the third label panel 24 on a pharmaceutical container 12 that carries a prescription of diabetic medicine. As such, the advertisements may be patient specific. The advertisements may also be tied to a specific location such as local businesses within a certain distance of the pharmacy or group of pharmacies where the pharmaceutical storage system was purchased. Specific items can also be advertised, such as specials for a particular business or the pharmacy where the pharmaceutical storage system was purchased. Additionally, coupons may be added to the advertisements.

Alternatively, advertisements preferably having similar dimensions as the third label panel 24 of label 14 are preprinted by the pharmacy or third party. In these situations, the advertisement is not printed on the third label panel 24 even when the prescription information fits entirely within the first label panel 20. The pharmacist applies the label 14 containing only the first and second label panels 20 and 22 to a larger container 12 and then applies one of the pre-printed advertisements alongside label 14. This embodiment may be particularly useful in situations where the pharmacist would like the advertisement to be printed in color but the pharmacist's standard label printer does not have color printing capability.

As shown in FIG. 7, an alternate embodiment is shown where the third label panel 24 is used to print a bilingual label that includes the most pertinent information contained in the first and second label panels 20 and 22 in a language that is different from the language printed on the first and second label panels 20 and 22. Such an embodiment may be particularly useful for pharmacies located in heavy bilingual locations. Referring to the example of FIG. 7, the first label panel 20 and second label panel 22 are printed for the verapamil prescription substantially as described above. As the third label panel 24 is not needed in providing the prescription information and auxiliary information in English, the third label panel 24 is used to print in Spanish the instructions to the patient for taking the pharmaceutical, the purpose of the pharmaceutical, and the auxiliary information. In situations described below in which it is explained that an advertisement may be printed on a third label panel 24, it should be understood that a bilingual label containing prescription and warning information in a separate language than the language of the first and second label panels 20 and 22 may be printed on the third label panel 24 instead of the advertisement.

Figure 8:
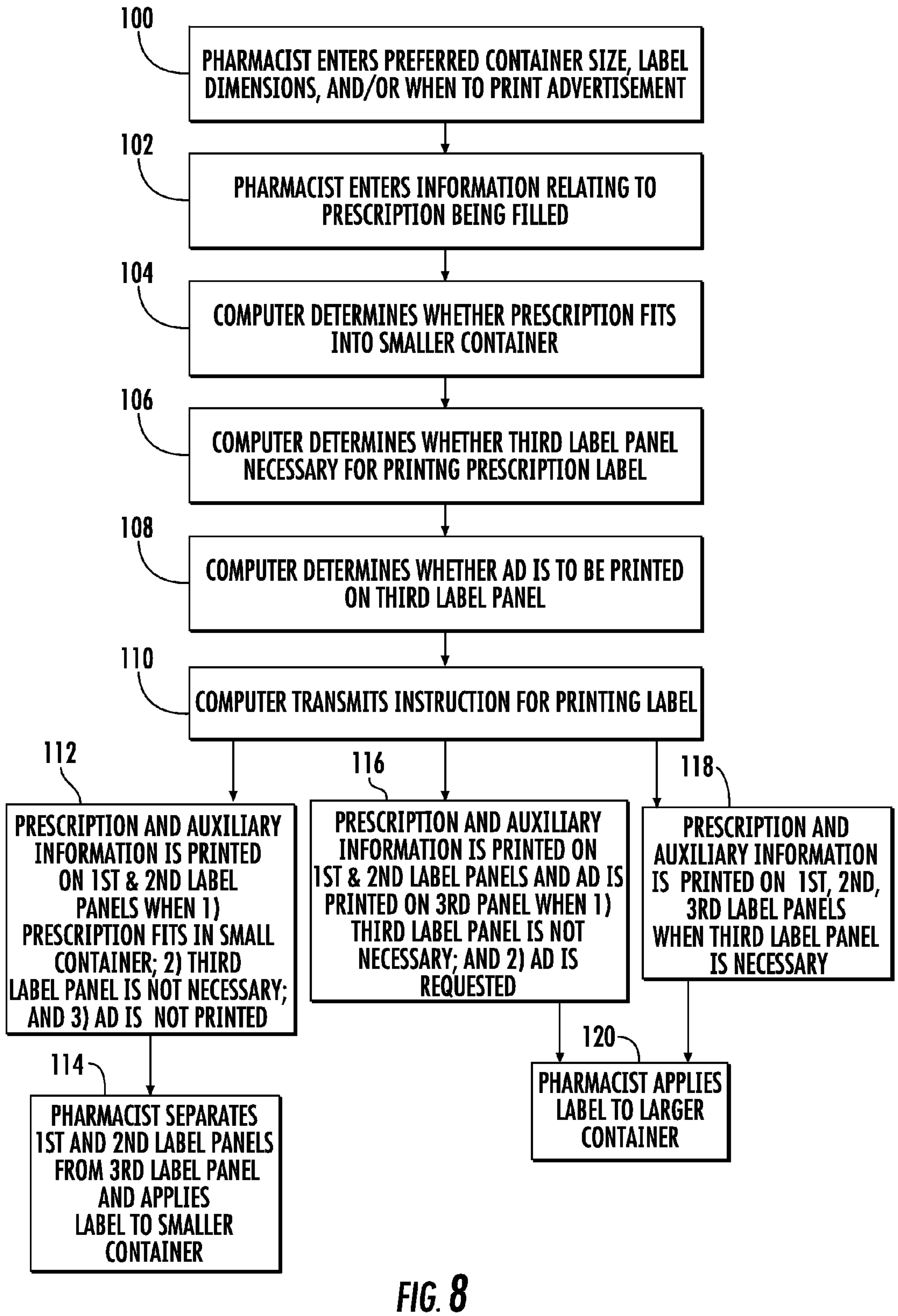
FIG. 8 depicts a flow chart of a method of printing a label for a pharmaceutical prescription according to one embodiment of the disclosure.

Referring to FIG. 8, a method of the present disclosure for printing and applying the labels to a pharmaceutical container 12 using a computer system is depicted. It should be understood that the following steps are not required to be performed in any particular order. In step 100, information regarding a pharmacist's or other user's preferences is provided to the computer system such as the preferred container size, the dimensions of the rectangular label 14 to which the pharmaceutical prescription will be printed, and/or when an advertisement or other information should be printed on the third label panel 24 if possible. For example, the pharmacist may provide that the preferred container size is a 13 dram container. Based on this information, the computer system recognizes that it will not need to print an advertisement on the third label panel if the pharmaceutical prescription will fit in the 13 dram container 12 even when the third label panel is available to be printed on as a label containing all three panels will not fit on the 13 dram container.

By providing a preferred container size, the computer system may also be programmed to print the pharmaceutical prescriptions onto a label 14 having particular dimensions that correspond to the preferred container size, i.e., about 2.125 inches in height and a combined length of the first and second label panels of about 4 inches for a preferred container size of 13 drams. For a typical 16 dram container, the height of the label 14 may be increased to about 2.5 inches. Alternatively or in conjunction with the information regarding the container size, the pharmacist may provide the particular dimensions of the labels 14 loaded into the printer.

In step 102, the pharmacist enters certain information pertaining to the particular pharmaceutical prescription to be filled such as the particular pharmaceutical prescription and patient identification into a pharmacist computer. Certain information, such as purpose, instruction, and/or auxiliary information, is preferably predetermined based on the particular pharmaceutical identified by the pharmacist, or the pharmacist may individually enter/edit this information for printing on the labels.

In step 104, the computer system determines whether the particular pharmaceutical prescription entered in step 102 will fit into one of the smaller container sizes, i.e., a 13 or 16 dram container. In situations in which the particular pharmaceutical prescription does not fit into one of the smaller container sizes, a larger container will be required.

In step 106, the computer system determines whether the third label panel 24 is necessary by determining whether the prescription information fits entirely on the first label panel 20 of the label 14 loaded into the printer. In preferred embodiments, the computer system is programmed to know how many characters will fit on the first label panel 20 for each label size and formatting options such as font type and size. The computer system then calculates the character count required for the prescription information of a particular pharmaceutical prescription. If the size of the prescription information exceeds the size available for the chosen label, the computer system determines that the prescription information does not fit entirely on the first label panel 20 and divides the prescription information into two portions.

Similarly, the computer system may determine whether the third label panel 24 is necessary in step 106 by determining whether the prescription information and auxiliary warning information fit entirely on the first and second label panels 20 and 22. For example, in embodiments where the prescription information and warning information may be combined on label panels or where the warning information may over flow to the third label panel 24 as described in certain embodiments above, the computer system will need to determine whether the prescription information and auxiliary warning information fits entirely on the approximately 4 inch label 14 containing the first and second label panels 20 and 22. If the computer system determines that it is necessary to print the auxiliary label or at least some of the warning information on the third label panel 24, a larger container will be required.

In step 108, the computer system determines whether an advertisement or other information is to be printed on the third label panel 24 based on the preferences entered into the system in step 100. When it is determined in step 106 that it is necessary to print the auxiliary label or at least some information on the third label panel, the system recognizes that the third label panel 24 is not available for an advertisement. Similarly, when it is determined in step 104 that the pharmaceutical prescription will fit in the smaller sized container and the preferences indicate that the user would like to apply the label to the smaller sized container if possible, the system preferably recognizes that it does not need to print an advertisement on the third label panel 24 even if it has been determined in step 106 that it is not necessary to print warning information on the third label panel 24. In situations in which the user has indicated that an advertisement is not to be printed on the third label panel 24, such as the case when the pharmacist is using pre-printed color advertisements, step 108 may be unnecessary.

In step 110, the computer system transmits the information entered in step 102 to the label printer along with instructions for printing the information on the label 14. The instructions for printing the information will vary based on the determinations made by the computer system in steps 104, 106, and 108.

Referring to steps 112 and 114, in situations where it has been determined that the pharmaceutical prescription fits into a smaller container size, the third label panel 24 is not to be used to print an advertisement, and that it is not necessary to print at least some of the warning information on the third label panel, the label printer prints the prescription information and auxiliary information on the first and second label panels 20 and 22 of the first label section in step 112. In step 114, the pharmacist removes the first label section from the third label panel 24 of the second label section from the first label section and applies the label 14 containing the first label section to the suitable smaller container.

Referring to step 116, in situations where it has been determined that the prescription information does not fit entirely on the first label panel 20 or it is otherwise necessary to print at least some of the warning information on the third label panel 24, the label printer prints a portion of the prescription information on the first label panel 20, the remaining portion on the second label panel 22, and the auxiliary label on the third label panel 24. In step 120, the pharmacist applies the label 14 having first, second, and third panels 20, 22, and 24 to a suitable larger container.

Referring to step 118, in situations where it has been determined that it is not necessary to print at least some of the warning information on the third label panel but it has otherwise been determined that the pharmaceutical prescription does not fit into a smaller container size or the third label panel 24, if available, is to be used to print an advertisement, the label printer prints the prescription information and auxiliary information on the first and second label panels 20 and 22. The third label panel 24 is then left blank or printed with an advertisement depending on the determination of step 108.

In step 120, the pharmacist applies the label 14 having at least the first and second label panels 20 and 22 to a suitable larger container. If an advertisement is printed on the third label panel 24, the label containing all three labels will be applied to the larger container. If an advertisement is not printed on the third label panel 24, the first label section having the first and second label panels 20 and 22 is preferably removed from the third label panel 24 of the second label section prior to applying the first label section of label 14 to the larger container. A pre-printed advertisement may then be applied to the container.

According to an alternate embodiment of the method described above, the pharmacist or other user may choose to always print an advertisement on the third label panel 24 when the third label panel 24 is available. In this embodiment, before applying the label 14 to a container, the pharmacist chooses whether to remove the third label panel 24 from label 14 based on which sized container the pharmacist would like to use to fill the pharmaceutical prescription.

According to another embodiment of the disclosure, a roll of a plurality of the labels 14 may be provided. The roll is particularly suitable for use in an automated label printing system. In this embodiment, each panel is preferably operable to be removed from an adjacent panel. During printing of a prescription, the prescription information of a first prescription is printed on the first label panel 20, second label panel 22, and third label panel 24 substantially as described above. However, if the third panel 24 is not needed, such as with the verapamil prescription, and the pharmacist does not wish to print an advertisement on the third label panel 24, the first and second panels 20, 22 are removed from the roll, and label 14 containing the first and second label panels 20, 22 is applied to the prescription container.

Accordingly, what would have been an unwanted or wasted label, e.g., the third label panel 24, becomes the first label panel 20 of the next prescription to be printed. As will be appreciated, in the course of printing large numbers of prescription labels, the savings in both ink and label material achieved by avoiding the unwanted label 24 is significant. In embodiments in which the dispensing of pharmaceuticals is automated, providing a roll of a plurality of labels is preferred and the process of removing necessary panels from the roll is automated as well by the dispensing machine.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A method of producing a label for a prescription pharmaceutical storage container for holding and dispensing a pharmaceutical for a patient, whereby a pharmacy may reduce a number of distinct labels required for labeling containers having different sizes for saving the pharmacy money, reducing the pharmacy workflow requirements, reducing inventory, and enhancing productivity, the method including the steps of:

providing a supply of prescription pharmaceutical storage containers, the supply including a first container and a second container, the first container having a circumference greater than a circumference of the second container;

providing a label system having at least a first distinct label panel, a second distinct label panel, and a third distinct label panel positioned in horizontal alignment on a single rectangular label, the first label panel, the second label panel, and the third label panel providing a first prescription label configuration having a length greater than the circumference of the second container, and the first label panel and the second label panel being operable to be separated from the third label panel for providing a second prescription label configuration having a length corresponding to the circumference of the second container;

printing indicia providing critical prescription information on the first label panel, the critical prescription information including at least instructions for taking the pharmaceutical and an identification of the pharmaceutical;

determining whether a length of the critical prescription information fits on the first label panel;

printing indicia providing one of a continuation of the critical prescription information and warning information on the second label panel based on the determination of whether the length of the critical prescription information fits on the first label panel, the continuation of the critical prescription information being printed on the second label panel when the length of the critical prescription information is determined to be too long to fit on the first label panel and the warning information being printed on the second label panel when the length of the critical prescription information is determined to fit on the first label panel;

printing indicia providing the warning information on the third label panel when the second label panel includes the continuation of the critical prescription information;

separating the first and second label panels from the third label panel when the length of the critical prescription information fits on the first label panel; and applying one of the first prescription label configuration and the second prescription label configuration to one of the first container and the second container, the second prescription label configuration being applied to the second container when the length of the critical prescription information fits on the first label panel and the third label panel is separated from the first and second label panels, the first prescription label configuration being applied to the first container when the length of the critical prescription information is too long to fit on the first label panel.

2. The method of claim 1, wherein the critical prescription information is printed in at least 12-point font.

3. The method of claim 2, wherein the critical prescription information further includes a purpose of the pharmaceutical.

4. The method of claim 1, wherein the steps of determining whether the length of the prescription information fits on the first label and printing indicia on the first, second, and third label panels comprise automated steps performed by a computer controller.

5. The method of claim 1, wherein the label system includes a perforated line disposed between the second label panel and the third label panel for assisting removal of the first label section from the second label section.

6. The method of claim 5, wherein the label system includes a perforated line disposed between the first label panel and the second label panel for assisting removal of the second label panel from the first label panel.

7. The method of claim 1, wherein at least the second container is cylindrically shaped.

8. The method of claim 1, wherein the second container has a volume of approximately 13 drams to about 20 drams.

9. The method of claim 1, wherein the second container has a volume of approximately 13 drams or less.

10. The method of claim 1, wherein the circumference of the second container is between 4 inches and 5 inches and the first label section has a length of 5 inches or less.

11. The method of claim 1, further including the step of printing one of an advertisement and a bilingual label on the third label panel when the length of the critical prescription information fits on the first label panel.

12. The method of claim 1, wherein the applying step includes applying one of the first prescription label configuration and the second prescription label configuration to one of the first container and the second container without any portion of the label system extending radially from the first or second container.

13. The method of claim 1, wherein the first label panel, second label panel, and third label panel are of substantially the same height which is less than or equal to the height of both the first container and the second container.

14. A method of producing a label for a prescription pharmaceutical storage container for holding and dispensing a pharmaceutical for a patient, whereby a pharmacy may reduce a number of distinct labels required for labeling containers having different sizes for saving the pharmacy money, reducing the pharmacy workflow requirements, reducing inventory, and enhancing productivity, the method including the steps of:

providing a supply of prescription pharmaceutical storage containers, the supply including a first container and a second container, the first container having a circumference greater than a circumference of the second container;

providing a label system having a first distinct label section and a second distinct label section secured in horizontal alignment to the same substrate, both the first label section and the second label section being operable to be removed together from the substrate for providing a first prescription label configuration having a length greater than the circumference of the second container, and the first label section being operable to be separated from the second label section for providing a second prescription label configuration having a length corresponding to the circumference of the second container;

determining whether a length of desired prescription information fits entirely on the first label section;

upon determining that the length of the desired prescription information does not fit entirely on the first label section, printing indicia providing the desired prescription information on both the first label section and the second label section and applying the first prescription label configuration to the first container; and upon determining that the length of the desired prescription information fits entirely on the first label section, printing indicia providing the desired prescription information on the first label section, separating the first label section from the second label section to form the second prescription label configuration, and applying the second prescription label configuration to the second container.

15. The method of claim 14, wherein the first label section and the second label section are of substantially the same height which is less than or equal to the height of both the first container and the second container.

16. The method of claim 14, wherein the desired prescription information includes critical prescription information including at least instructions for taking the pharmaceutical and an identification of the pharmaceutical.

17. The method of claim 16, wherein the desired prescription information further includes warning information.

18. The method of claim 14, wherein at least the second container is cylindrically shaped.

19. The method of claim 14, wherein the second container has a volume of approximately 13 drams to about 20 drams.

20. The method of claim 14, wherein the second container has a volume of approximately 13 drams or less.

21. The method of claim 14, wherein the circumference of the second container is between 4 inches and 5 inches and the first label section has a length of 5 inches or less.

22. The method of claim 14, wherein applying the first prescription label configuration to the first container and applying the second prescription label configuration to the second container is accomplished without any portion of the label system extending radially from the first or second container.

* * * * *